United States Patent [19]
Miyashita et al.

[11] Patent Number: 5,473,106
[45] Date of Patent: Dec. 5, 1995

[54] KARAOKE REPRODUCING APPARATUS

[75] Inventors: Masahiko Miyashita, Tokorozawa; Kouichi Ono; Yoshiaki Moriyama, both of Tsurugashima; Sumio Hosaka, Tokorozawa; Hiroshi Fujii; Tatsuyuki Miyazawa, both of Tokyo, all of Japan

[73] Assignee: Pioneer Electronic Corporation, Tokyo, Japan

[21] Appl. No.: 248,006

[22] Filed: May 24, 1994

[30] Foreign Application Priority Data

May 26, 1993 [JP] Japan .................................. 5-124068
May 26, 1993 [JP] Japan .................................. 5-124069

[51] Int. Cl.$^6$ .......................... G09B 15/02; G10G 3/04; G10H 1/26
[52] U.S. Cl. ........................... 84/609; 84/462; 84/477 R
[58] Field of Search .......................... 84/602, 609–614, 84/634–638, 645, 462, 477 R, 478

[56] References Cited

U.S. PATENT DOCUMENTS 5,250,747  10/1993  Tsumura ............................. 84/477 R X

*Primary Examiner*—Stanley J. Witkowski
*Attorney, Agent, or Firm*—Keck, Mahin & Cate

[57] ABSTRACT

A karaoke reproducing apparatus for recording singing sound together with karaoke play sound, has a facility of printing information on the recorded musical program. The karaoke reproducing apparatus has a memory which contains previously stored recorded music information including at least the title, songwriter's name, and composer's name for each of musical programs recorded on the recording medium. In response to a recording start command, the recorded music information corresponding to a musical program selected by an operation is read from the memory, and output to a printer. Since recorded music information can be printed on a printed member such as a label and preserved as a record when singing sound is recorded together with karaoke play sound, the label, if adhered to a recording medium on which the sound is recorded, allows the user to readily know the recorded contents afterward. According to another aspect of the invention, a karaoke reproducing apparatus has a memory which contains copy right information on each of musical programs recorded on a recording medium. For a recording prohibited musical program, its karaoke play music can be prevented from being recorded so as to appropriately protect the copy right thereof.

7 Claims, 8 Drawing Sheets

FIG. 6

| PLAY ORDER | MUSIC SELECTION NUMBER | RECORDING FLAG |
|---|---|---|
| 1 | 7 6 0 4 | 0 |
| 2 | 1 2 1 0 | 1 |
| 3 | 3 4 0 6 | 1 |
| 4 | 5 4 1 2 | 0 |
| ⋮ | ⋮ | ⋮ |

FIG. 7

| COPY RIGHT CODE | NAME OF COPY RIGHT OWNER | RECORDING PERMITTED/ PROHIBITED |
|---|---|---|
| 0 | — | 1 |
| 1 | A COMPANY | 1 |
| 2 | B COMPANY | 1 |
| 3 | C COMPANY | 0 |
| 4 | D COMPANY | 1 |
| 5 | E COMPANY | 0 |

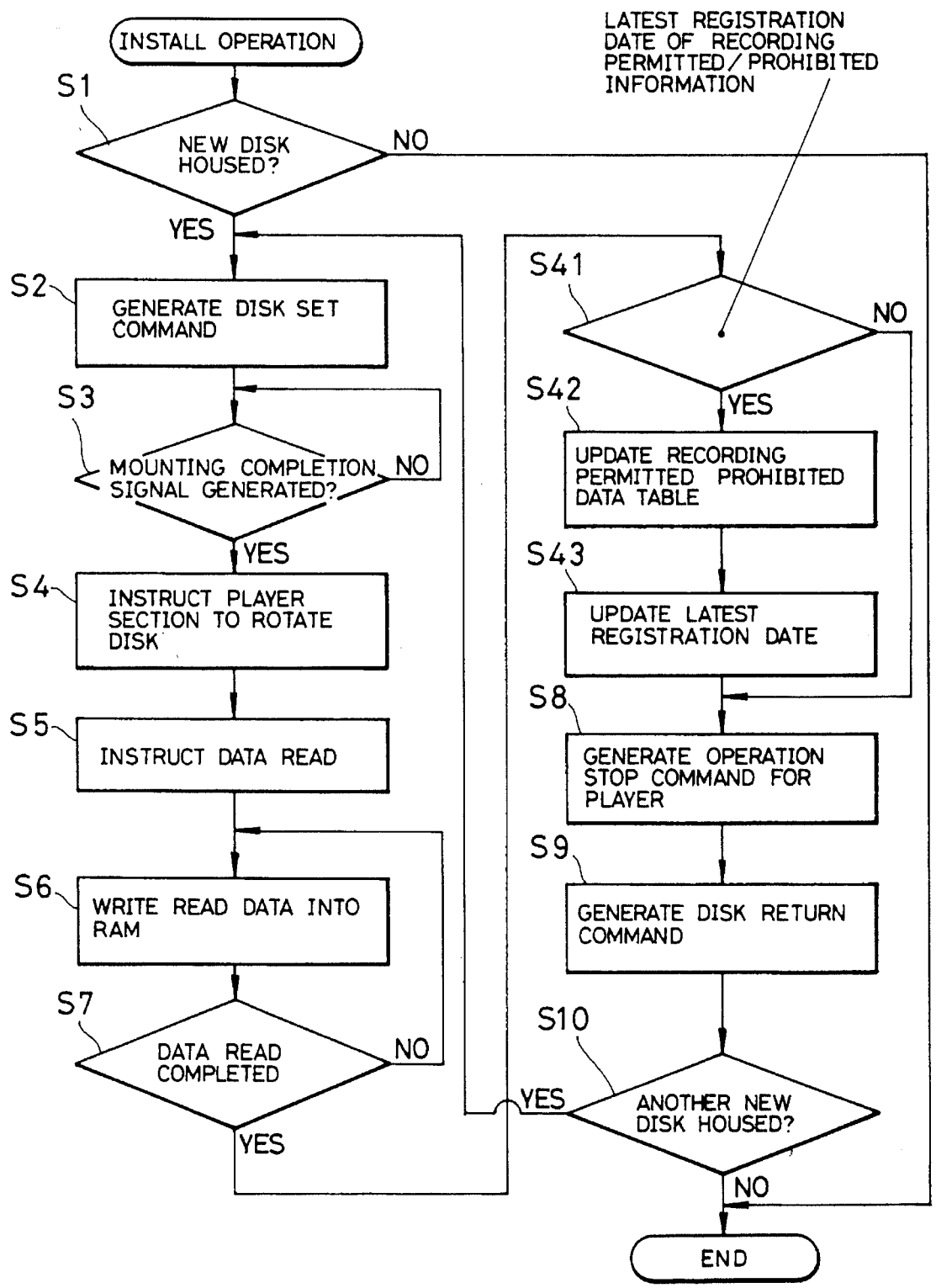

KARAOKE REPRODUCING APPARATUS

BACKGROUND OF THE INVENTION

1. Field of the Invention

The present invention relates to an apparatus for reproducing accompanied music, having recording media on which a plurality of musical programs are recorded, so as to reproduce one selected from the plurality of musical programs. The accompanied music especially prepared for people to sing with will be called "karaoke music", as is generally done, and a reproducing apparatus particularly for reproducing the karaoke music will be called the "karaoke reproducing apparatus" in this specification.

2. Description of Background Information

Some karaoke reproducing apparatuses include a recording apparatus or output terminals for connection with an external recording apparatus so as to enable a song sung by a person to be recorded with karaoke music. The recording is performed on a recording medium such as a compact disk which may be reproduced on a later date in order for the person to listen to the song the person sang accompanied with the karaoke music.

It is desirable that the recording medium thus recorded be provided with a label, attached thereon, on which information on recorded music such as the titles of songs are written, so that the contents of the recording medium can be readily known afterwards without actually reproducing it.

However, writing recorded music information on a label requires time and labor to a user, and such written information, if only including the titles, may be insufficient for later use.

Another point to be considered in recording karaoke play sound is that such recording act is subjected to the copy right law so that there are musical programs of which recording is permitted and those of which recording is prohibited, depending on copy right owners of the respective musical programs.

Conventionally, users have determined whether nor not recording is permitted to a selected musical program by use of a reference table. Stated in another way, the right of copy right owners has been protected from illegal recording, placing confidence in users that they would not record music of which recording is prohibited. Alternatively, there is a karaoke reproducing apparatus which only collects musical programs of which recording is permitted, in order to avoid the handling of matters related to the copy right.

It is however difficult to appropriately protect the right of copy right owners while placing confidence in users. Moreover, the above-mentioned karaoke reproducing apparatus, which only has recording permitted musical programs, cannot unfailingly provide musical programs with which people desire to sing.

SUMMARY OF THE INVENTION

It is a primary object of the present invention to provide a karaoke reproducing apparatus which is capable of printing information on recorded music when singing sound is recorded together with its karaoke play sound.

It is another object of the present invention to provide a karaoke reproducing apparatus which is capable of playing recording prohibited musical programs while the copy right is appropriately protected for such recording prohibited musical programs.

A karaoke reproducing apparatus according to a first aspect of the present invention has a recording medium on which at least karaoke play sound for a plurality of musical programs are recorded, means for generating a music selection command indicative of a musical program selected from the plurality of musical program in response to an operation, and player means for playing the musical program indicated by the music selection command on the recording medium, and is characterized by a memory containing previously stored copy right information on each of the musical programs recorded on the recording medium; means for reading from the memory the copy right information corresponding to the music selection command; determination means for determining whether or not recording is permitted to the selected musical program in accordance with the read copy right information; and control means for generating a control signal for controlling a recorder in accordance with the determination result of the determination means.

The karaoke reproducing apparatus according to the first aspect of the present invention is provided with the memory which contains previously stored information on each recorded music including at least the title, songwriter's name, and composer' name. Recorded music information corresponding to a musical program selected by an operation is read from the memory in response to a recording start command, and the recorded music information thus read out is output to the printer.

A karaoke reproducing apparatus according to a second aspect of the present invention has a first recording medium on which at least karaoke play sound for a plurality of musical programs are recorded, means for generating a music selection command indicative of a musical program selected from the plurality of musical program in response to an operation, and player means for playing the musical program indicated by the music selection command on the recording medium, and is characterized by means for generating a recording start command to a recorder for recording karaoke play sound and singing sound; a memory containing previously stored recorded music information of each of the musical programs recorded on the first recording medium, the recorded music information including at least the title, songwriter's name, and composer's name of each of the musical programs; means responsive to the recording start command for reading from the memory the recorded music information corresponding to the music selection command; and output means for outputting the read recorded music information to a printer.

The karaoke reproducing apparatus according to the second aspect of the present invention is provided with the memory which contains previously recorded copy right information on each of musical programs recorded on a recording medium. The copy right information corresponding to a musical program selected by an operation is read from the memory in order to determine whether or not the selected musical program may be recorded on the basis of the read copy right information, and a control signal for controlling the recorder is generated in accordance with the determination result.

BRIEF DESCRIPTION OF THE DRAWINGS

FIG. 6 is a table showing a selected musical program list;

FIG. 7 is a table showing data on recording permitted/prohibited musical programs;

FIG. 9 is a flow diagram showing anther example of the installing operation.

DESCRIPTION OF THE PREFERRED EMBODIMENTS

The present invention will hereinafter be described in connection with preferred embodiments thereof with reference to the accompanying drawings.

Figure 1:
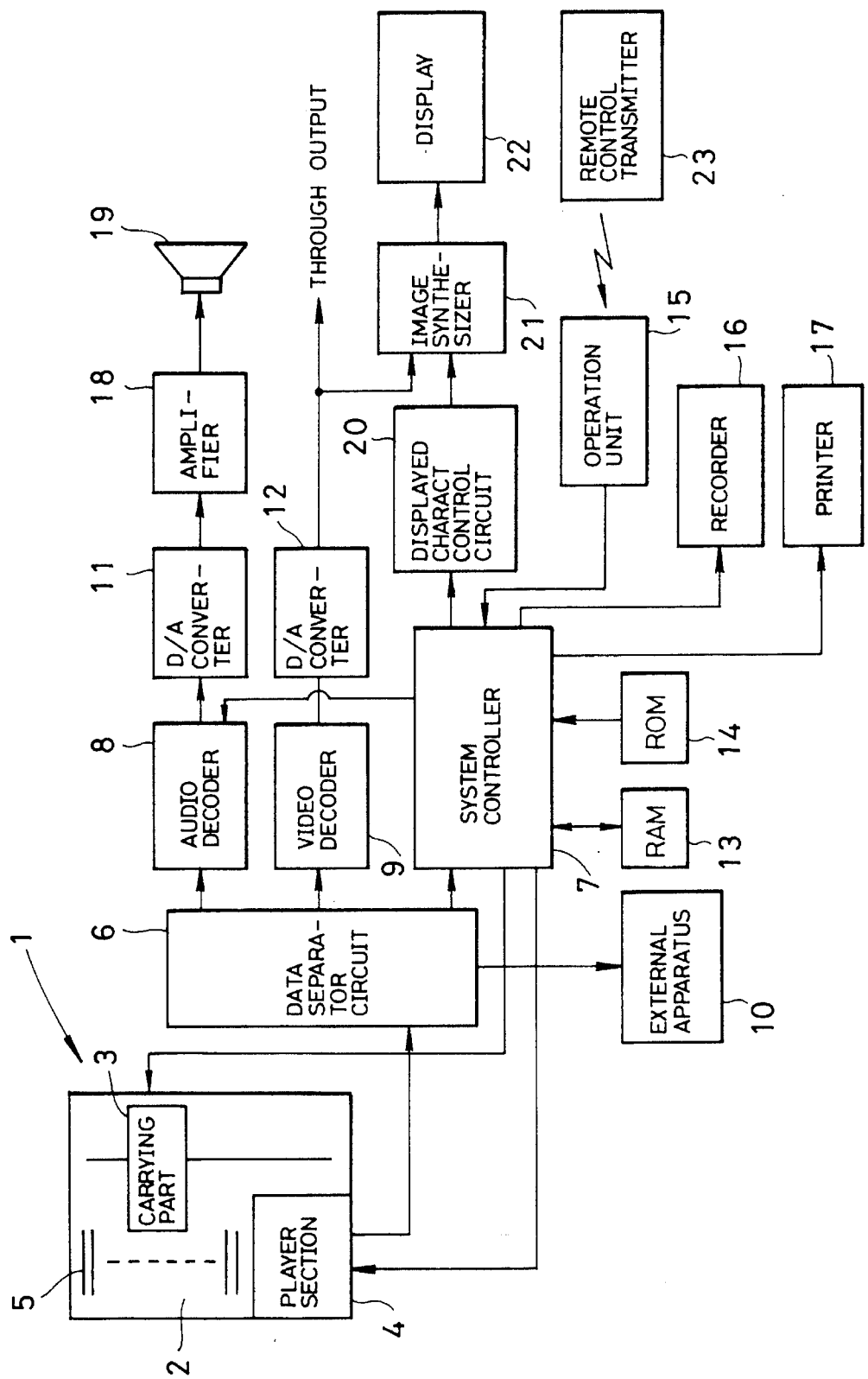
FIG. 1 is a block diagram showing a karaoke reproducing apparatus according to one embodiment of the present invention.

In a karaoke reproducing apparatus shown in FIG. 1, an automatic disk changer 1 is provided with a disk container 2, a disk carrying part 3, and a player section 4. A plurality of disks 5 are housed in the disk container 2, such that one of these disks 5, selected to be played, is carried to a turn table (not shown) in the player section 4 by the carrying part 3. When the play is over, the disk on the turn table is returned to a predetermined position in the disk container 2 by the carrying part 3. The player section 4 plays the disk on the turn table and outputs data read from the disk. The disk carrying part 3 and the player section 4 are operated in response to commands from a system controller 7 which will be later described.

A data output of the player section 4 is connected to a data separator circuit 6. The data separator circuit 6 separates data output from the player section 4 into a variety of data such as compressed image data, compressed audio data, control data, information data, and so on, and outputs these data portions from separate output terminals. The data separator circuit 6 is connected to the above-mentioned system controller 7 as well as to an audio decoder 8 and a video decoder 9. The data separator circuit 6 is also provided with a terminal for connecting an external apparatus 10 thereto. The external apparatus 10 may be a controller for illumination, video images, telops and so on which are used to produce stage effects for people who want to sing.

The audio decoder 8 decodes separated compressed audio data to recover therefrom decompressed audio data such as PCM digital data. Since the compressed audio data includes audio data of plural channels, the audio decoder 8 decodes audio data of a specified channel in accordance with a signal from the system controller 7. The audio data output from the audio decoder 8 is supplied to a D/A convertor 11 and converted to an analog audio signal which is supplied to a speaker 19 through an amplifier 18. The video decoder 9 decodes separated compressed image data to recover therefrom decompressed image data. The image data output from the video decoder 9 is supplied to a D/A convertor 12 and converted to an analog moving video signal which is output, as it is, as well as is supplied to an image synthesizer 21.

The system controller 7 comprises a microcomputer which receives separated information data. The information data is once stored in a RAM (Random Access Memory) 13 and selectively read therefrom. Information data read from the RAM 13 is processed in the system controller 7 and supplied to a displayed character control circuit 20. The displayed character control circuit 20 has a character generator and a V-RAM so as to generate character data to be displayed, corresponding to supplied information data, writes the generated character data into the V-RAM, reads the character data to be displayed from the V-RAM in synchronism with a synchronization signal of the moving video signal, and converts the read character data to s character video signal which is output to the image synthesizer 21. The character video signal is synthesized with the moving video signal from the D/A convertor 12 in the image synthesizer 21.

The system controller 7 is connected to an operation unit 15, a recorder 16, and a printer 17. The operation unit 15 has a keyboard for specifying a musical program to be played as well as a receiver (not shown) for receiving the specified musical program from a remote control transmitter 23. The recorder 16 records played karaoke music with singing sound on a recordable compact disk (not shown) such as CD-R. Audio signals representative of the karaoke play sound and the singing sound are supplied from an amplifier 18 to the recorder 16. The printer 17 prints recorded music information such as the title on a label to be adhered on a compact disk.

Figure 2:
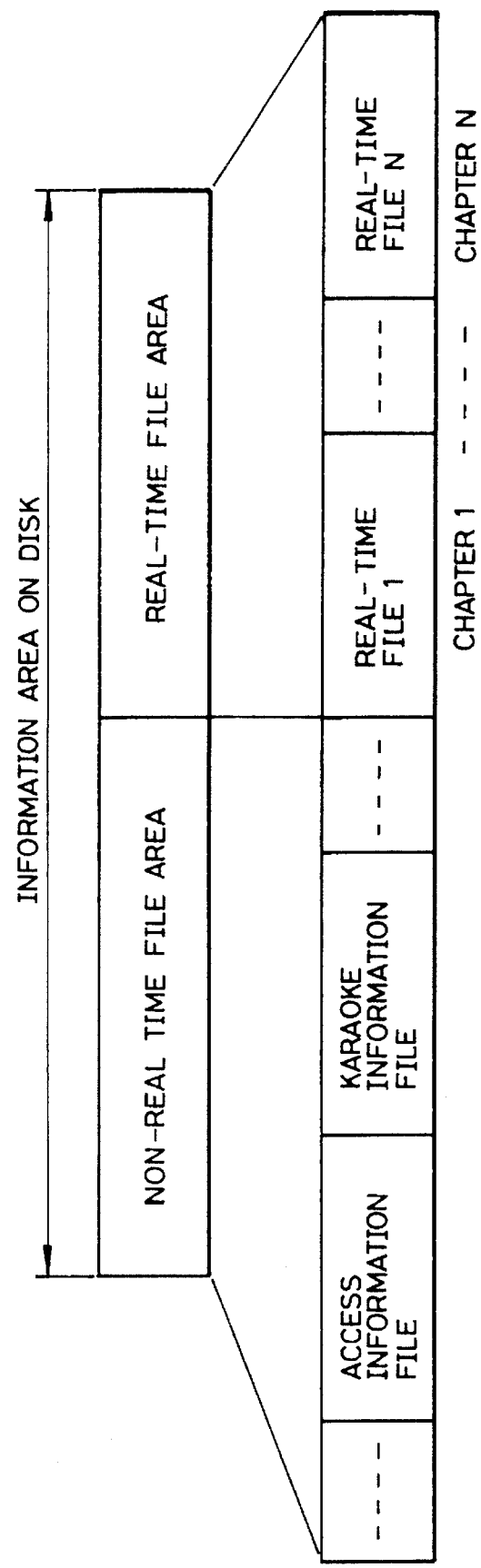
FIG. 2 is a diagram showing the structure of an information area on a disk.
Figure 3:
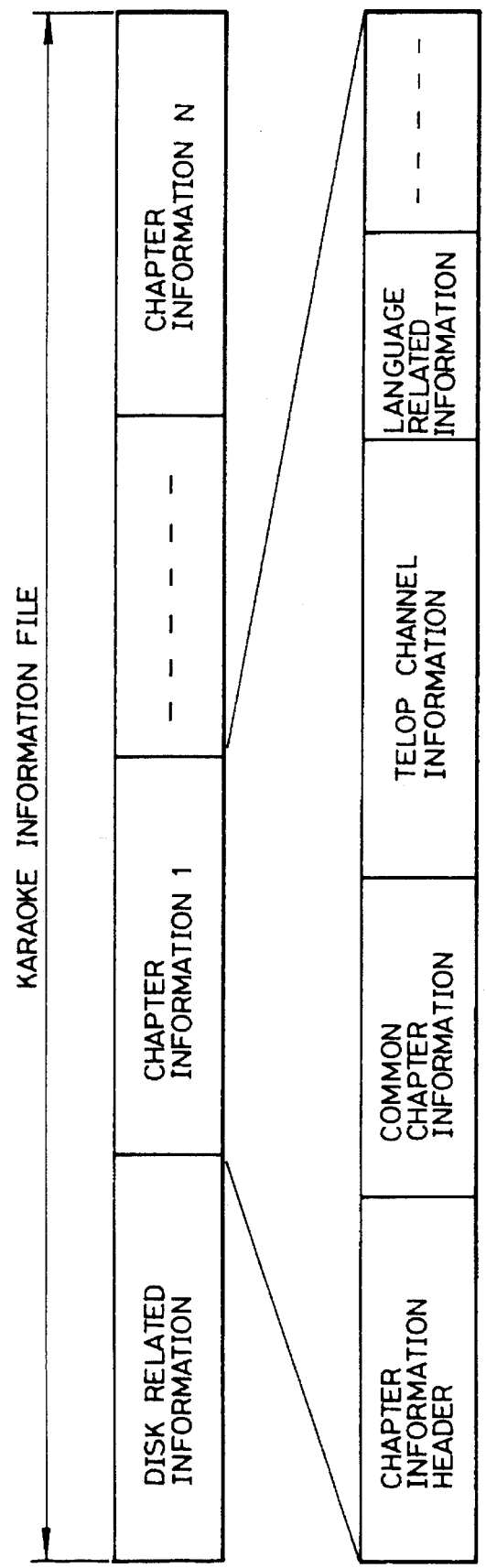
FIG. 3 is a diagram showing the structure of a karaoke information file.

Next, the contents recorded on the disk 5, which is played by the player section 4, will be explained with reference to FIGS. 2 and 3. On the disk 5, all information is recorded in a digital signal form, for example, in conformity to the MPEG (Moving Picture Expert Group) standard. Specifically, as shown in FIG. 2, each information recording area on the disk 5 has a non-real time file area and a real time file area. Recorded on the non-real time file area are access information file such as TOC and karaoke information file such as titles of musical programs. On the other hand, on the real time file area, N real time files are recorded (N is an integer number which corresponds to the number of musical programs). Each real time file is called in a unit named "chapter", where one chapter corresponds to one musical program. One chapter of real time file comprises compressed image data and compressed audio data of a musical program, and real time data except for image and audio data. These data portions are recorded in the file in a time-division multiplex manner.

The access information file comprises information indicative of the position on a disk and a time length of each chapter. By referring to this information, an arbitrary chapter can be accessed. The karaoke information file comprises a variety of information related to the disk and music, the structure of which is shown in FIG. 3. The karaoke information file includes a disk related information and one or more chapter information sections. One chapter information section represents one chapter, i.e., music related information, and the number of chapter information sections coincides with the number of musical programs recorded on the disk. The disk related information includes information on all about the disk, specifically, the contents of the disk, identification of the disk itself, the number of musical programs recorded on the disk, and so on.

Each chapter information section includes a chapter information header, common information used in all chapters, telop channel inherent information, and language related information. The chapter information header comprises information for identifying an associated chapter information section, information indicative of the contents of the same, and so on. The common chapter information comprises (1) the original country of an associated musical program; (2) the published date of the musical program; (3) the duration of the musical program; (4) a copy right code;

(5) the classification of the singer; (6) the classification of the musical program; (7) a subjective impression and theme of the musical program; (8) a situation of the musical program; (9) a special classification of the musical program; (10) a speed of the musical program; (11) an impression given by the musical program; (12) difficulty of the musical program for singing; (13) a multi-audio mode; (14) a background image; (15) information on control devices; (16) a DSP mode; and so on.

The telop channel inherent information relates to character information (telop) corresponding to an associated chapter. A plurality of character information sequences (telop channel) may be assigned to a chapter. For example, a plurality of telops in different languages selectable may be added to a chapter. The telop channel inherent information comprises (1) the number of telop channels; (2) a telop channel number; (3) a language in which an associated telop is written; and (4) a style of characters constituting the telop. Among the foregoing information, the telop language and telop character style are repetitively recorded a number of times equal to the number of telop channels.

The language related information is information depending on a language, among the information on an associated chapter, and comprises (1) the number of language related information blocks; (2) a language code; (3) a description code system; (4) a language related information size; (5) the title of a musical program; (6) how to read the title; (7) singer's name; (8) how to read the singer's name; (9) songwriter's name; (10) how to read the songwriter's name; (11) composer's name; (12) how to read the composer's name; (13) the first fraise; (14) how to read the first fraise; (15) data on location; and so on. The information sections from (2) a language code to (15) data on location are repetitively recorded a number of times equal to the number of language related information blocks.

Figure 4:
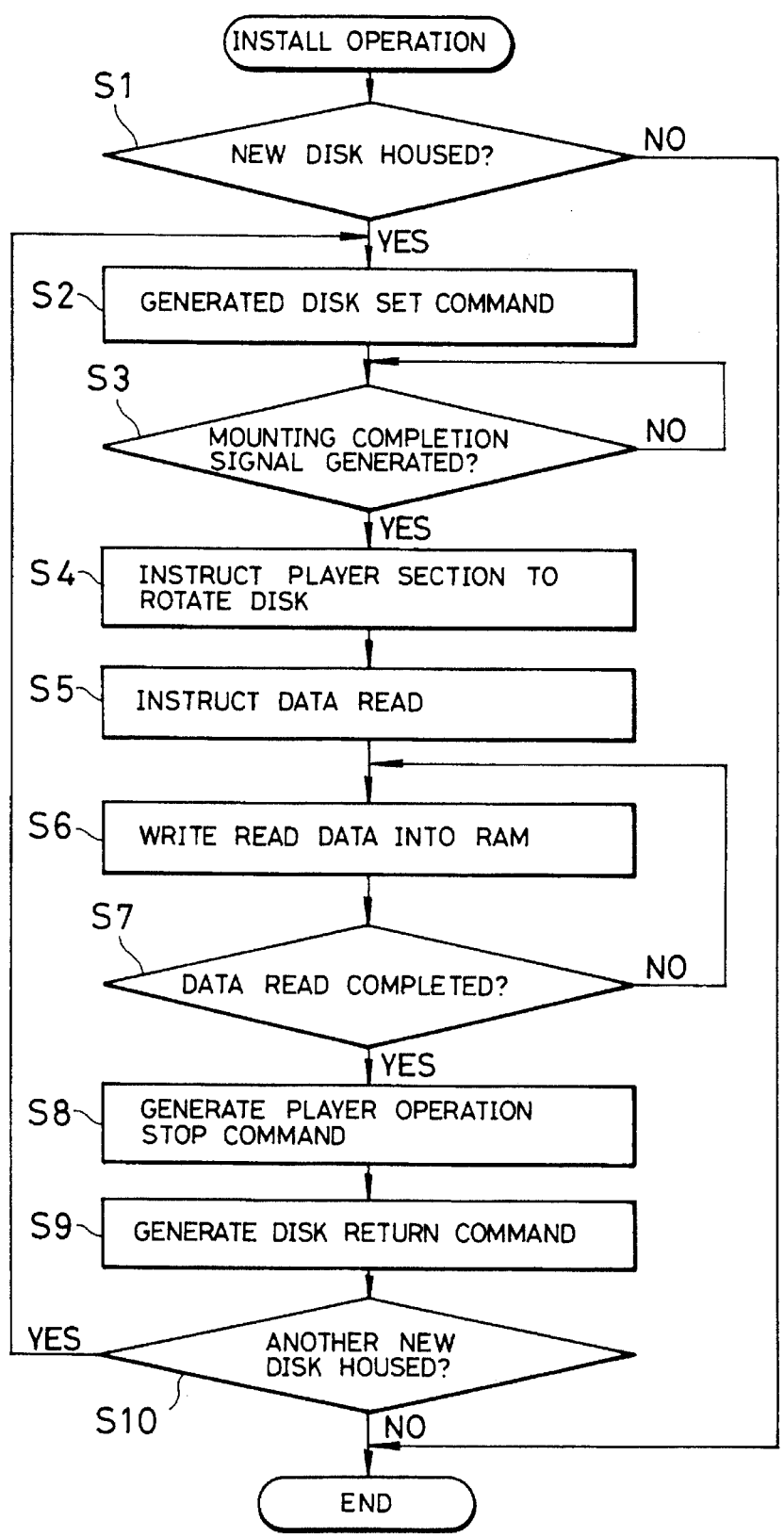
FIG. 4 is a flow diagram showing an installing operation.

Next, the operation of the above described karaoke reproducing apparatus will be explained with reference to FIG. 4. When a disk is newly housed in the disk container 2 of the automatic changer 1, an installing operation is first performed. In this installing operation, the system controller 7, when detecting that a disk has been housed in the disk container 2 (step S1), generates a disk set command to the disk carrying part 3 in order to mount the disk on the turn table of the player section 4 (step S2). When the disk carrying part 3 has mounted the disk on the turn table of the player section 4, the system controller 7 is informed of this fact by a mounting completion signal supplied thereto. When the system controller 7 thus receives the mounting completion signal (step S3), it instructs the player section 4 to drive the turn table (step S4) and read data from the thus mounted disk (step S5). The player section 4 rotates the turn table together with the disk mounted thereon, and after the rotating speed of the turn table has reached a predetermined value, the player section 4 reads and outputs data from the non-real time file area of the disk.

The read data is supplied to the system controller 7 through the data separator circuit 6, and temporarily stored in a buffer memory (not shown) in the system controller 7. The system controller 7 sequentially writes the supplied data into the external RAM 13 (step S6), and determines whether or not the player section 4 has read necessary data from the disk (step S7). For example, until a bit indicative of the completion of data supply is supplied to the system controller 7 to determine that the data read has been completed, the supplied data is written into the RAM 13 by the repetitive executions of step S6. When the data read has been completed, the system controller 7 generates an operation stop command to the player section 4 (step S8), and generates a disk return command to the disk carrying part 3 (step S9). The player section 4, responsive to the disk return command, stops the rotation of the turn table, and thereafter the disk carrying part 3 carries the disk on the turn table to the disk container 2 and houses it in a defined housing position therefor in the disk container 2. The system controller 7, after executing step S9, determines whether or not another new disk has been housed (step S10). If there is another new disk which has been housed in the disk container 2, the flow jumps back to step S2 to repeat the foregoing steps S2–S9. Conversely, if there is no new disk housed, the installing operation is terminated.

While all the above-mentioned data in the access information file and the karaoke information file may be written into the RAM 13, minimally required data may be data on a musical program including the unique disk number of a disk; an address indicative of the accommodating position therefor in the disk container 2; the title of the musical program; the singer's name; the songwriter's name; the composer's name; the duration of the musical program; a copy right code; the classification of the musical program; a speed of the musical program; difficulty of the program music for singing; a multi-audio mode; and so on.

Incidentally, a new disk can be housed by a command input by the user from the operation unit 15. Also, a sensor may be provided for detecting the presence or absence of a disk in each housing position in the disk container 2, with a region for storing the detection result being reserved in the RAM 13, such that outputs of all sensors are compared with the related contents stored in the RAM 13 to determine housing of new disks and to write the detection result into the RAM 13.

Also, while in the above described embodiment the music data such as the title of a musical program is derived together with image data and audio data when a recorded disk is installed, the music data such as the title only may be derived from a dedicated disk, on which the music data only is recorded, when the disk is installed. Alternatively, the music data of a plurality of disks having image data and audio data recorded thereon may be recorded on one of these plural disks so as to derive the music data from the one disk when it is installed.

Figure 5:
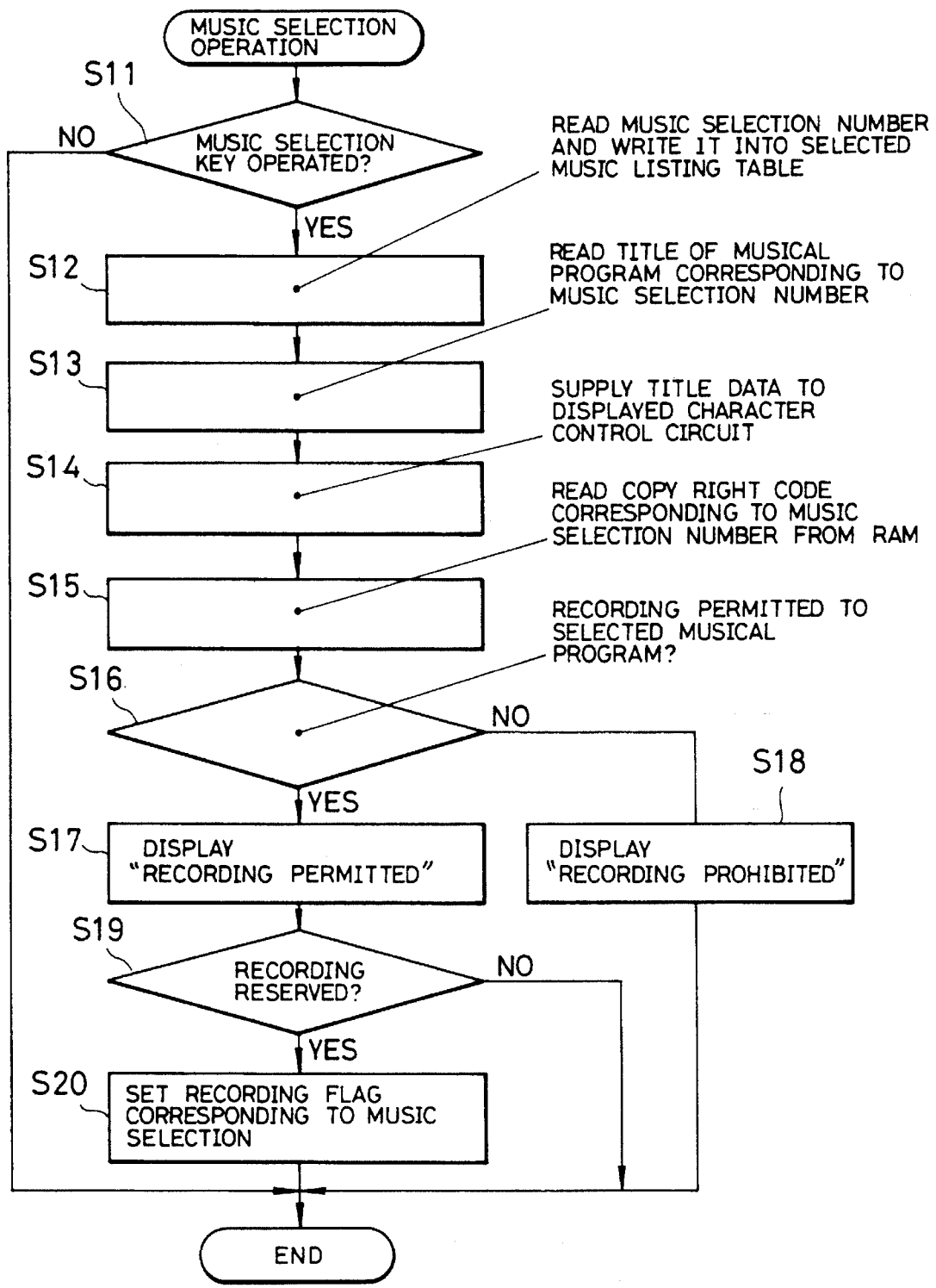
FIG. 5 is a flow diagram showing a music selection operation.

In the foregoing manner, after the installing operation has been performed, a musical program selected by the user can be reproduced for the karaoke purpose, i.e., in order for a person to sing a song accompanied with the karaoke music sound. First, in a music selection operation, the user inputs a number indicative of a selected musical program through numerical keys or alphanumerical keys on the operation unit 15 or the remote control transmitter 23. The selection number, consisting of a plurality of digits, is a number for specifying a disk and a musical program recorded on the disk, and is held in a buffer (not shown) in the operation unit 15 when it is input by key pressing. As shown in FIG. 5, the system controller 7 determines, at a predetermined timing or by an interrupt operation, whether or not a music selection key (not shown) on the operation unit 15 has been pressed (step S11). If the music selection key has been pressed, the music selection number is read from the buffer and written into a selected music listing table in the RAM 13 (step S12). The selected music listing table is formed in the RAM 13, in which music selection numbers and recording flags, later described, are written in the playing order as shown in FIG. 6. When a musical program corresponding to the first music selection number has been finished, the order of the following music selection numbers are moved up. The title of a musical program corresponding to a read music selection number is read from the RAM 13 as information data (step S13), and the read data is supplied to the displayed character control circuit 20 (step S14). The displayed character control circuit 20 generates displayed character data indicative of the title of the music program, which is written in a predetermined position of the V-RAM. The displayed character data read from the V-RAM is converted to a character video signal which is then output to the image synthesizer 21. In the image synthesizer 21, when the character video signal is a signal indicative of a predetermined color, it is output in place of a moving video signal from the D/A convertor 12, whereby the character video signal is synthesized with the moving video signal. In this manner, the title of the selected musical program is displayed on the display 22 as a character video image, thus confirming that the musical program selected by the key operation has been accepted.

The system controller 7, after executing step S14, reads a copy right code corresponding to the read music selection number from the RAM 13 (step S15). Since the RAM 13 contains the copy right codes which were read from the disk during the installing operation and written thereinto, the corresponding one is read from the RAM 13. The copy right code is a code indicative of the copy right owner of a musical program. It is then determined on the basis of the read copy right code whether or not the selected musical program may be recorded (step S16). A ROM (Read Only Memory) 14 provided outside the system controller 7 has the copy right codes, copy right owners' names, and data indicating whether each musical program is recordable, previously written therein as a recording permitted/prohibited data table, as shown in FIG. 7. For the recording permitted/prohibited data, "1" indicates a recording permitted musical program, while "0" a recording prohibited musical program. Thus, whether a selected musical program may be recorded or not is determined from the recording permitted/prohibited data table. If a musical program may be recorded, a mark indicative of "recording permitted" is displayed (step S17), whereas if it may not recorded, a mark indicative of "recording prohibited" is displayed (step S18). These indications may appear on the display 22 or on an indicator (not shown) separately provided on the apparatus for indicating whether recording is permitted or prohibited. When they are displayed on the display 22, the displayed character control circuit 20, responsive to a command from the system controller 7, generates displayed character data indicative of recording permitted or recording prohibited which is written into the V-RAM.

Figure 8:
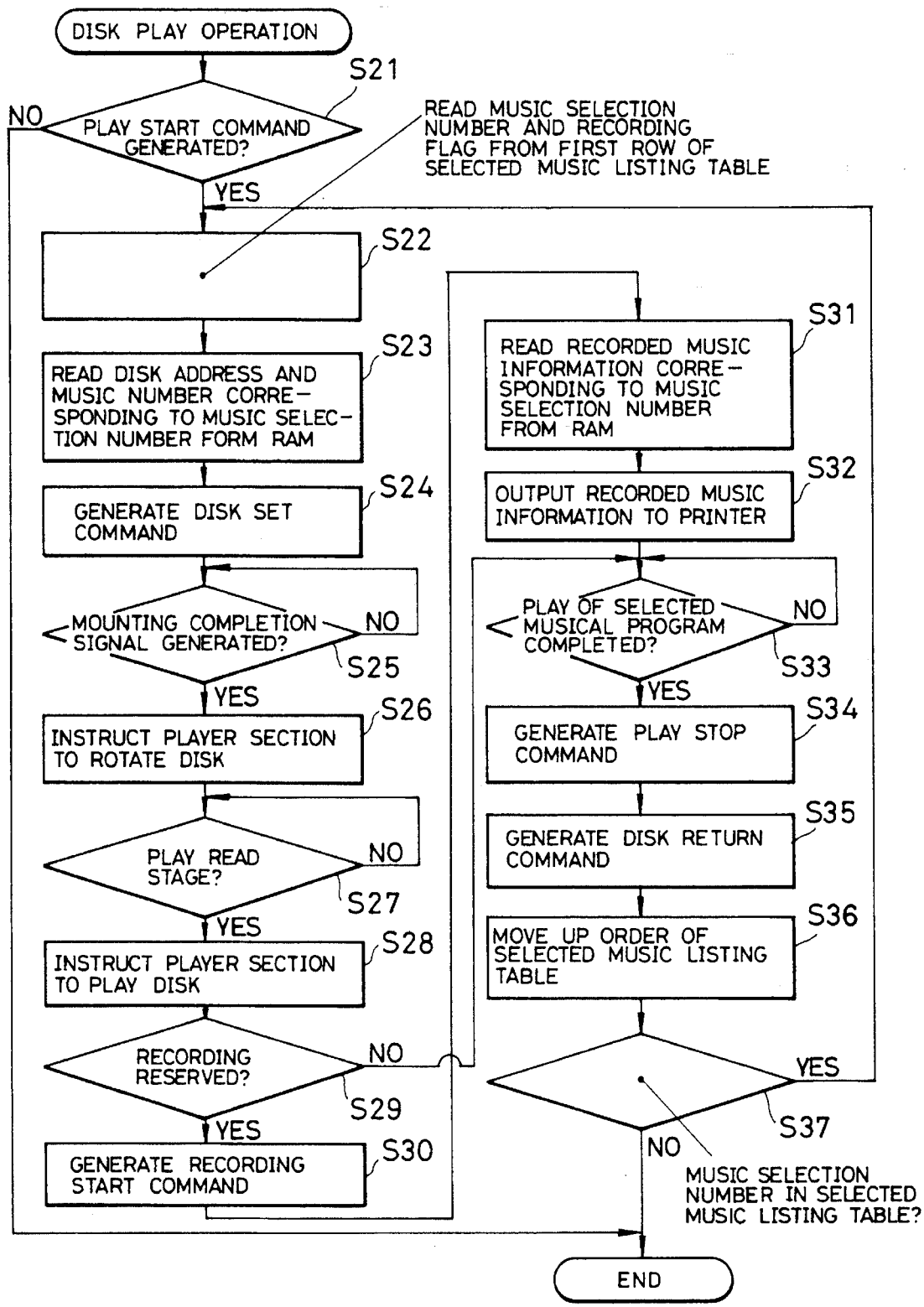
FIG. 8 is a flow diagram showing a disk play operation.

The system controller 7, after executing step S17 for determining whether recording is permitted or prohibited, determines whether or not recording has been reserved (step S19). This determination is made by checking whether or not a recording reservation key on the operation unit 15 or the remote control transmitter 23 has been pressed. If recording has been reserved, a recording flag in the above-mentioned selected music listing table is set (step S20). Since the selected music listing table has the recording flag previously set at "0", indicative of recording not reserved, as an initial value, this recording flag is switched to "1", indicative of recording reserved, corresponding to a music selection number when the recording reservation key has been pressed. Next, the disk play operation will be explained with reference to FIG. 8. As shown in FIG. 8, when the user instructs to start playing by key operation on the operation unit 15 (step S21), the system controller 7 reads a music selection number and a recording flag in the first row of the play order in the selected music listing table formed in the RAM 13 (step S22). Then, the disk address and the music number corresponding to the read music selection number are read from the RAM 13 (step S23). Next, a disk set command is generated to the disk carrying part 3 in order to mount a disk having the read disk address on the turn table of the player section 4 (step S24). When the disk carrying part 3 has carried the disk onto the turn table of the player section 4, a mounting completion signal is supplied to the system controller 7 (step S25). The system controller 7, upon receiving the mounting completion signal (step S25), instructs the player section 4 to rotate the disk (step S26), and determines whether or not the disk play may be started (step S27). For example, if a musical program is prohibited from being played by key operation on the operation unit 15, the disk play is not started. Conversely, if the disk play may be started, the system controller 7 instructs the player section 4 to play the disk from a track corresponding to the read music number (step S28). In this manner, the player section 4 starts playing the musical program specified by the music selection number, while reproduced video and audio signals are output to the display 22 and the speaker 19, respectively.

The system controller 7 also determines from the recording flag whether or not a recording reservation has been made. When the recording flag is set to "1", the system controller 7 generates a recording start command to the recorder 16 (step S30). Since the recorder 16 is provided with audio signals including singing sound from the amplifier 18, these audio signals are recorded on a compact disk in response to the recording start command.

The system controller 7, after executing step S30, reads recorded music information corresponding to the music selection number read at step S22 from the RAM 13 (step S31). The recorded music information includes at least the title, the songwriter's name and the composer's name, and information such as the singer's name, recording date, place and so on may be added. The recorded music information, after being read out, are output to the printer 17 (step S32). The printer 17 prints the recorded music information on a label adapted to be adhered on the compact disk. With the recorded disk having the label adhered on a label surface thereof, the information on a recorded musical program is available on the disk. Incidentally, it goes without saying that the recorded music information may not be recorded on a label but directly on the label surface on the compact disk.

The system controller 7, after executing step S32, determines whether or not the play of the selected musical program has been completed (step S33). This determination is made from time information contained in the control data which is supplied from the data separator circuit 6 while the disk is being played. When the play of the selected musical program has been completed, the system controller 7 generates a play stop command to the player section 4 (step S34), and generates a disk return command to the disk carrying part 3 (step S35). Responsively, the player section 4 stops the disk play operation, and after the rotation of the turn table is stopped, the disk carrying part 3 carries the disk on the turn table to the disk container 2 and accommodates the disk in an accommodating position reserved therefor. The system controller 7, after generating the disk return command, moves up the play order in the selected music listing table by one (step S36), and determines whether or not a music selection number is recorded at the top of the selected music listing table (step S37). If a music selection number is recorded there, the flow returns to step S22 to repeat the above described operations. On the contrary, if no music selection number is recorded, the disk play operation is terminated.

FIG. 9 shows another procedure of the installing operation. This installing operation is applied to the case where the copy right owner, recording permitted/prohibited data, and a registration date of the recording permitted/prohibited data are recorded on a disk in addition to the copy right code. In this case, the recording permitted/prohibited data table shown in FIG. 7 is formed in the RAM 13, not in the ROM 14. More specifically, as can be seen from FIG. 9, this installing operation executes steps S1–S7 similarly to those of the installing operation shown in FIG. 4, wherein read data is written into the RAM 13 through the system controller 7. In this write operation, the copy right owner and the recording permitted/prohibited data are not written into the recording permitted/prohibited data table but they are written simply as data on a disk or on each musical program. When the data read has been completed, it is determined whether or not the recording permitted/prohibited data read from the disk is the latest (step S41). If the read recording permitted/prohibited data is not later than the latest registration data stored in the RAM 13, the flow proceeds to step S8, where the operation of the player section 4 is stopped. On the other hand, if the read recording permitted/prohibited data is later than the latest registration data stored in the RAM 13, the recording permitted/prohibited data table is updated using the read copy right owner and recording permitted/prohibited data (step S42). Further, the latest registration date is updated by replacing it with the read registration date of the recording permitted/prohibited information (step S43). After executing step S43, the flow proceeds to step S8. Steps S8–S10 in FIG. 9 are similar to those of the installing operation shown in FIG. 4.

Incidentally, it is also possible to design the apparatus that a service engineer is allowed to modify the copy right owner and recording permitted/prohibited data in the recording permitted/prohibited data table by special key operation on the operation unit 15 when he maintains and checks the karaoke reproducing apparatus.

Also, it is apparent that a recording medium, having at least a plurality of karaoke play sound recorded thereon, is not limited to the disk but may be any other recording medium such as a tape. As described above, the karaoke reproducing apparatus according to a first aspect of the present invention is provided with the memory which contains previously stored information on each recorded music including at least the title, songwriter's name, and composer' name. Recorded music information corresponding to a musical program selected by an operation is read from the memory in response to a recording start command, and the recorded music information thus read out is output to the printer. Therefore, since recorded music information including at least the title, songwriter's name and composer's name can be printed on a printed member such as a label and preserved as a record when singing sound is recorded together with karaoke play sound, the label, if adhered to a recording medium on which the sound is recorded, conveniently allows the user to readily know the recorded contents afterward.

Moreover, the karaoke reproducing apparatus according to a second aspect of the present invention is provided with the memory which contains previously recorded copy right information on each of musical programs recorded on a recording medium. The copy right information corresponding to a musical program selected by an operation is read from the memory in order to determine whether or not the selected musical program may be recorded on the basis of the read copy right information, and a control signal for controlling the recorder is generated in accordance with the determination result. For a recording prohibited musical program, recording of its karaoke play music can be prevented, so that the copy right thereof can be appropriately protected. On the other hand, karaoke play sound for recording prohibited musical programs may be reproduced in order for people to sing to the accompaniment of the karaoke play sound, thereby avoiding a problem that the karaoke reproducing apparatus cannot provide people with karaoke play sound with which they want to sing.

What is claimed is:

1. A karaoke reproducing apparatus having a recording medium on which at least karaoke play sound for a plurality of musical programs are recorded, means for generating a music selection command indicative of a musical program selected from said plurality of musical programs in response to an operation, and player means for playing said musical program indicated by said music selection command on said recording medium, said apparatus comprising:

a memory containing previously stored copy right information on each of said musical programs recorded on said recording medium;

means for reading from said memory the copy right information corresponding to said music selection command;

determination means for determining whether or not recording is permitted to the selected musical program in accordance with the read copy right information; and control means for generating a control signal for controlling a recorder in accordance with the determination result of said determination means.

2. A karaoke reproducing apparatus according to claim 1, wherein said recording medium has said copy right information recorded thereon, and said copy right information is previously read from said recording medium and stored in said memory.

3. A karaoke reproducing apparatus according to claim 1, wherein said determination means has a data table in which recording permitted/prohibited information is recorded corresponding to the copy right information of each of said plurality of musical programs, and said data table is used to determine whether recording is permitted or prohibited.

4. A karaoke reproducing apparatus according to claim 3, wherein said data table is successively updated.

5. A karaoke reproducing apparatus having a first recording medium on which at least karaoke play sound for a plurality of musical programs are recorded, means for generating a music selection command indicative of a musical program selected from said plurality of musical program in response to an operation, and player means for playing said musical program indicated by said music selection command on said recording medium, said apparatus comprising:

means for generating a recording start command to a recorder for recording karaoke play sound and singing sound;

a memory containing previously stored recorded music information on each of the musical programs recorded on said first recording medium, said recorded music information including at least the title, songwriter's name, and composer's name of each of the musical programs;

means responsive to said recording start command for reading from said memory the recorded music information corresponding to said music selection command; and output means for outputting the read recorded music information to a printer.

6. A karaoke reproducing apparatus according to claim 5, wherein said first recording medium has the recorded music information for each of the musical programs, and the recorded music information is previously read from said first recording medium and stored in said memory.

7. A karaoke reproducing apparatus according to claim 5, wherein said recorder records on a second recording medium, and said printer prints said recorded music information on a label for said second recording medium.

* * * * *